United States Patent [19]

Weiss et al.

[11] Patent Number: 5,422,461

[45] Date of Patent: Jun. 6, 1995

[54] CONTROL DEVICE AND SAFETY CIRCUIT FOR HEATING PADS WITH PTC HEATER

[75] Inventors: John Weiss, Amityville, N.Y.; K. Y. Lin, Taipei, Taiwan, Prov. of China

[73] Assignee: Micro Weiss Electronics, Inc., West Babylon, N.Y.

[21] Appl. No.: 990,530

[22] Filed: Dec. 15, 1992

[51] Int. Cl.⁶ ............................................. H05B 1/02
[52] U.S. Cl. .................... 219/501; 219/492; 219/508; 219/505; 219/212; 219/504; 323/235
[58] Field of Search .............. 219/212, 497, 492, 494, 219/501, 505, 504, 508–510, 481; 323/235, 236, 901, 319, 908; 307/117

[56] References Cited

U.S. PATENT DOCUMENTS

| | | | |
|---|---|---|---|
| 4,271,350 | 6/1981 | Crowley | 219/212 |
| 4,315,141 | 2/1982 | Mills et al. | 219/505 |
| 4,436,986 | 3/1984 | Carlson | 219/212 |
| 4,822,983 | 4/1989 | Bremner et al. | 219/505 |
| 5,081,339 | 1/1992 | Stine | 219/212 |
| 5,173,587 | 12/1992 | Nakano et al. | 219/212 |

*Primary Examiner*—Mark H. Paschall
*Attorney, Agent, or Firm*—Frishauf, Holtz, Goodman & Woodward

[57] ABSTRACT

Heating pads using positive temperature coefficient (PTC) resistance material are subject to fire risk if one of the conductor wires between which the PTC material extends should break and produce an electric arc. Protection by fuse and a fuse-blowing circuit responsive to fire detection must allow for an immense inrush of current when the cold pad is turned on. A heat setting control using a microprocessor can reduce the fuse rating by chopping the a.c. heating current for a short start-up period following with full-on feed until the heat setting is reached. The presence of a microprocessor allows response to a safety circuit that detects a break in a heater feed or return conductor before much excess heat develops, so that the microprocessor can turn off the heater switch. That response is so quick that it can be confirmed by repeated detection after very short pauses before the heater switch (a triac) is turned off. The safety circuit producing the fault detection signal may be external to the microprocessor chip, or most of it can be built into the microprocessor chip, which then receives two inputs from a smaller circuit connected to the heating pad. A second triac can be used to shut off the heater if the heater switch malfunctions by locking in its "on" position.

60 Claims, 8 Drawing Sheets

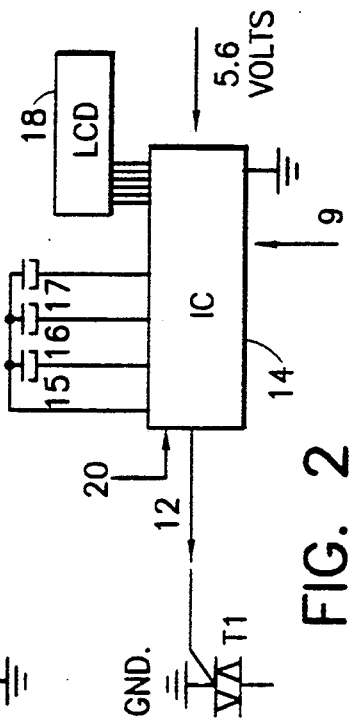
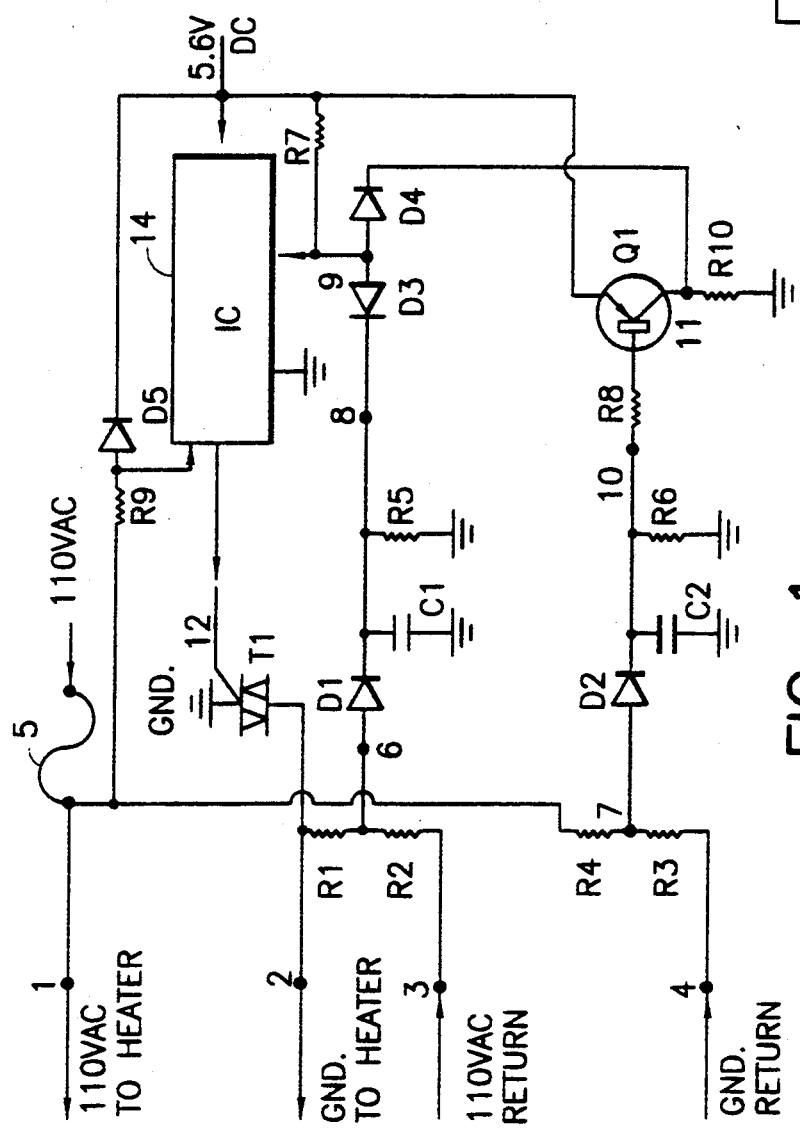
FIG. 1
FIG. 2

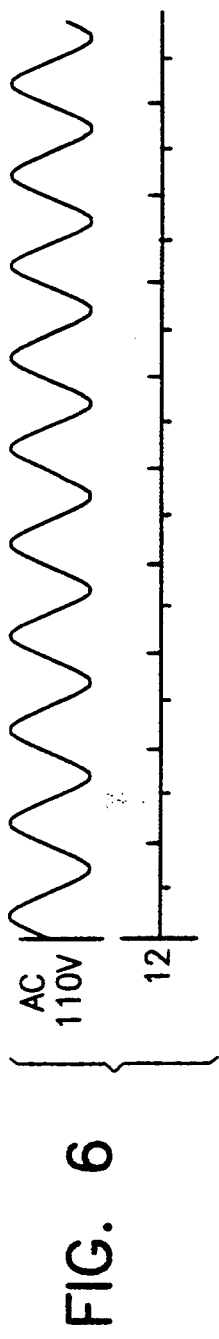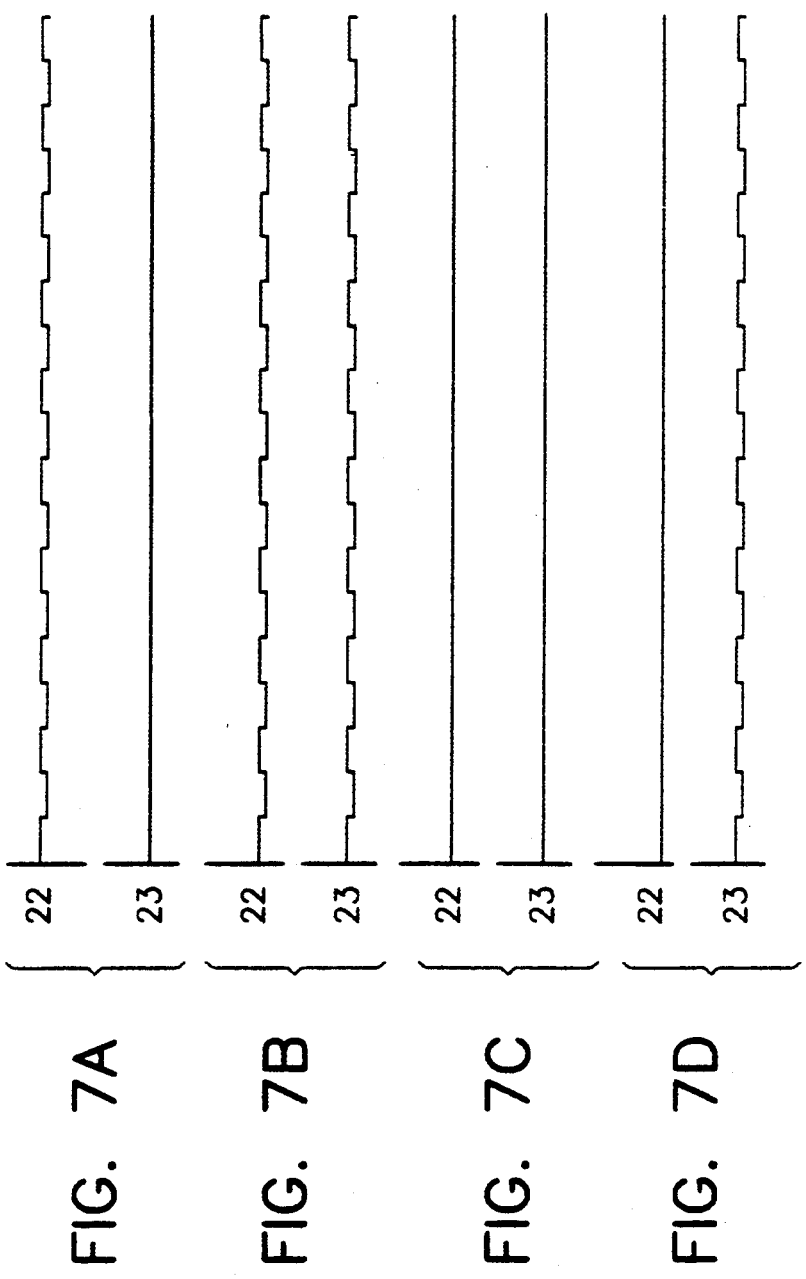

CONTROL DEVICE AND SAFETY CIRCUIT FOR HEATING PADS WITH PTC HEATER

BACKGROUND OF THE INVENTION

This invention is in the field of control devices and safety circuits for electrical heating pads and the like which use positive temperature co-efficient (PTC) materials for a heating element. It particularly concerns safety circuits and controls for alternating current heating pads because they usually involve higher voltages.

Heating pads and electric blankets are appliances that, by their nature, conduct high current electrical power in close proximity to the user. Besides the obvious danger of electrifusion as from any electrical appliance, a health concern exists regarding the prolonged exposure to the electromagnetic radiation. Heaters of the PTC type are known to be configured so as to virtually eliminate the magnitude of the electromagnetic fields thought to be harmful. The safe operation of the PTC heating elements is the focus of the present invention.

PTC materials used for heating elements have the added safety of limiting the current draw as the temperature approaches the design limit. With this in mind a heater can be designed without the need for an additional temperature limiting device, such as is disclosed in Crowely U.S. Pat No. 4,271,350. Due to the nonlinear response of temperature with current, sufficient temperature control can be achieved by proportioning power to the heater. The only condition that subverts the inherent safety of the PTC heating element is when one of the conductors, in intimate contact with the PTC material, breaks and arcing occurs. To prevent this condition from continuing and possibly causing fire, a safety curcuit is commonly used that detects the condition, and generates a current surge designed to blow the power input fuse, so that the unit is thereby disabled. Carlson, U.S. Pat No. 4,436,986, teaches the idea of sensing voltage changes and conducting sufficient current to disable the unit when neon bulbs exceed their breakdown voltages. Carlson goes further and incorporates three electrodes within a neon lamp forming a triode that breaks down at a single predetermined voltage, thus reducing the effect of break down voltage tolerance. Carlson uses a current limiting resistor to blow the fuse in a predetermined period of time. It is necessary for the current limiting resistor to be rated at a higher power than the fuse to provide a safe open circuit. The fuse, however, must be sized to handle currents of two to three times the continuous current rating of the heater to accommodate the inrush associated with the start up characteristic of the Positive Temperature Coefficient material. The fuse is also relied upon in Carlson's invention to deactivate the unit in all possibilities of short circuits.

A further development that improves the safety of a PTC heating element is taught by Clifford Stine, U.S. Pat. No. 5,081,339. Stine reduces the possibility of breakage and improves the heat dissipation when incorporating a PTC heating wire within a coplanar sandwiched construction, in conjunction with the heating of a waterbed so that the construction is also leak tight. A heat conductive layer and the local current throttling effect of the PTC material combine to provide the most efficient heating without occurrence of hot spots along any part of the heating element.

Typically, an adjustable bimetalic control switch is used to provide differing heat settings for the PTC heating. As the current flows through the bimetalic element, it heats up causing the element to bend due to the differential expansion of the metals that comprise the elements. The deflection causes the contacts to open and interrupt the current to the heater and the small bimetalic element to cease bending. The bimetalic element then cools down until contact is again made and the cycle repeats. The deactivation of this type of electro mechanical control, for safety reasons, is best accomplished by blowing a fuse that is in series with the switch.

Modem electrical power controls use solid state switching devices such as Silicon Control Rectifiers, Power Transistors, Solid State Relays and Triacs. Edwin Mills U.S. Pat. No. 4,315,141 uses a pair of solid state switches biased by a temperature sensitive capacitive element as a temperature overload circuit for conventional electric blankets. In these control systems, a small signal controls switching of larger load currents. Integrated circuits or micro processors can be used to provide the control signal required to operate high speed solid state switching. Micro circuits of this type are capable of operating at speeds many times the 50 or 60 HZ. commonly used in AC electrical power supplies. This capability makes it possible to control each AC cycle. In fact, the switching can occur as the AC waveform crosses zero. This type of control can lower the noise generation associated with AC switching and makes the most efficient use of AC power.

Recent advances in microwatt power control has improved the reliability of Integrated Circuits by assuring the proper voltage input to the micro controller. Jamieson and Weiss U.S. Pat. No. teach an extremly low power voltage detection and switching circuit to provide power input to an Integrated Circuit "IC" within a narrow voltage band when only a low power and variable supply is available. Watchdog timing circuits can be incorporated within an IC to perform the task of periodically resetting the IC and to avoid a prolonged lockup or ambiguous operation resulting from power faults and voltage spikes often associated with AC power.

The Jamieson and Weiss patent, above referred to, is the patent granted on allowed U.S. patent application Ser. No. 07/655,217, Filed Feb. 12, 1992.

SUMMARY OF THE INVENTION

The present invention utilizes art electrical feed back circuit and a semiconductor switching system to control power to a heating element of the Positive Temperature Co-efficient "PTC" type that requires a safe operation condition in the event of an open or short circuit. An integrated circuit is used to signal a solid state switch to time the on and off proportion of the a.c. electric power to a flexible PTC heating element in order to control the temperature. Since characteristically, the PTC element has the property of increased electrical resistance with increased temperature the natural effect of increasing temperature is to throttle down and limit the current draw. The ability to control the temperature of the heater, by current control or time proportioned power control is improved. The power control level is affected externally by a heat scale setting via up-down key pad or rotary potentiometer and internally by the feedback safety circuit.

In the first embodiment each of the heater return conductors closes a current loop through a voltage divider. The voltage of the junction of the two resistors comprising each of the voltage dividers is very sensitive to the effect of a break or open circuit in the heater conductors. The junction voltages are reconditioned and combined to provide a single voltage that is input into the control IC. The voltage level is detected and affects the sequence of micro electronic logic that determines the duty cycle of the control of power to the heater. If the voltage level is low then the logic would be caused to stop the activation of the solid state power switch. In respective versions of a second embodiment one or both of the heater return conductors closes a current loop clamped to ground and to a steady D.C. voltage to ground that is supplied to the control IC and the voltages at the ends of the heater return conductors are separately supplied to the IC, which then detects whether there is a fault.

In a preferred embodiment of the safety circuit, the power circuit of the heating pad contains a fuse that is sized for the normal current draw. The start up cycle, controlled by the IC, is designed to provide a limited duty cycle within the first few seconds and to raise the PTC material temperature and thus raise the electrical resistance in order to reduce the average inrush current. In this way the fuse, a slow blow type, avoids the design restraint associated with high inrush current typical with the PTC heating elements. With the fuse rated close to the normal current draw a current surge resulting from a short circuit quickly disables the power. After the initial cycle, designed to reduce the inrush current, a preheat cycle starts that raises the temperature of the pad to a certain temperature by allowing a 100% duty cycle for a period of time corresponding to the initial setting.

This preferred method of control allows the arrival to the desired temperature in a minimum time period without subjecting the entire power and control system to high inrush currents.

In a further development of the invention, the possibility that a Triac heater switch might lock up in the ON position is counteracted by adding a second Triac in series, also controlled by IC.

The response to a fault is so quick that less than a quarter of a second is an ample allowance for detecting a fault. In consequence, the first response, or the first fault responses to a fault may be allowed to interupt the ON condition of the heater switch for a period no longer than a second, so that a second response will come quickly if the fault persists, before a final switch-off is provided.

Instead of the second triac being in series with the heater switch triac, the second triac may be connected to blow the fuse by grounding its connection with the heater after enough fault detections (for example 10 of them or, more generally from 3 to 16 of them) to make it clear that the heater switch triac is locked in its "on" position.

Many features of one illustrated embodiment can be incorporated in another illustrated embodiment, as, for example, the different ways of using a second triac above mentioned.

BRIEF DESCRIPTION OF THE DRAWINGS

FIG. 1 is a diagram of a safety circuit in the according to the invention.

FIG. 2 is a block diagram of the heat control and display systems to which the safety circuit of the invention provides its output.

FIG. 6 is a plot of the power, and control signals of the preferred embodiment.

FIG. 7 is a plot of the feedback signals of the preferred embodiment

DESCRIPTION OF THE PREFERRED EMBODIMENTS

Figure 3:
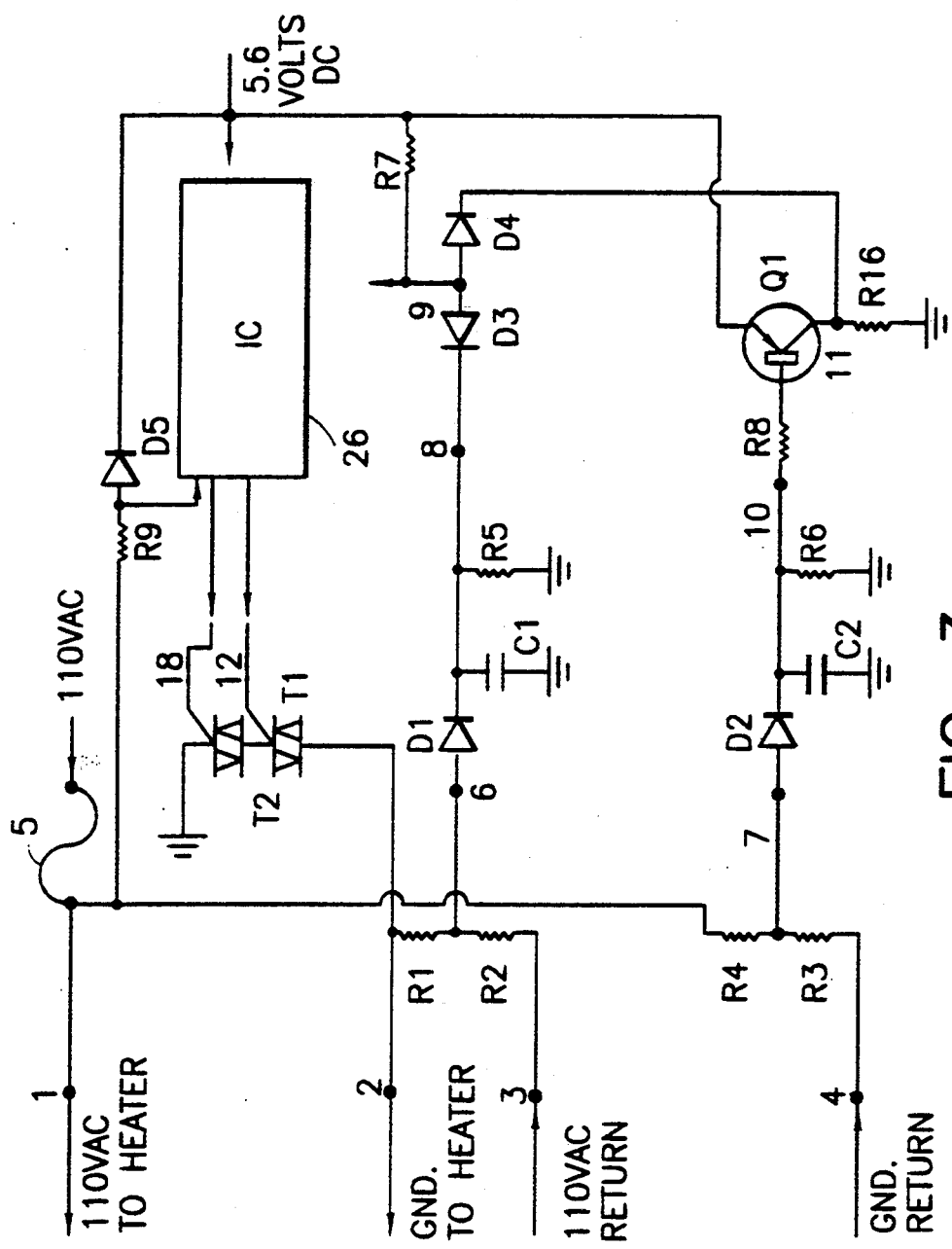
FIG. 3 is a diagram of an alternate safety circuit embodiment showing a redundant safety switch.

FIG. 1 shows a first embodiment of the safety feedback of the invention circuit. The PTC heater element (not shown) and the power input to the heater 110 volt 60 HZ, connects to the heater conductor 1 with the fuse 5 in series relation to the input power. The circuit is completed by the PTC heater element second power conductor 2 connected through the Triac T1 to ground. The Triac will conduct no power until a signal is sent to the gate 12 by the Intergrated Circuit, IC. To avoid noise associated with switching AC loads that may affect other appliances, TV's, radios, etc., a high impediance AC signal is input to the IC through Resistor R9 and clamped to a DC power input voltage through Diode D5. This signal is used to co-ordinate the firing of the Triac T1 as the AC power wave form is near the zero crossing. In this way switching occurs at instantaneous low voltage preventing voltage spikes as may occur when switching at other than at 0° or 180° phase angles. The resistance of the PTC heater is between the conductors attached to 1 and 2. This resistance is low at first causing a high current draw. As the temperature of the PTC material heats up the resistance between the two conductors increases and less current is drawn. The heater is considered to be a parallel relation between conductors 1 and 2. Conductor 1 is returned to the control circuit at junction 3 and conductor 2 is returned to the control circuit at junction 4. The return of conductor 1 through junction 3 is connected to the conductor 2 through a pair of resistors R2 and R1 forming a voltage divider at junction 6. Similarly, the return conductor through junction 4 is connected to conductor 1 through a pair of resistors R3 and R4. As with R2 and R1, R3 and R4 form a voltage divider. The junction voltage at 6 and 7 are sensitive to breaks in the respective feed conductor.

Typical values of the components used to demonstrate the action of this embodiment are listed in table 1. The actual values used will depend on the required response time to determine a fault.

TABLE 1

| Component | Type or Value |
|---|---|
| R1 | Resistor 10K OHM ¼ Watt |

TABLE 1-continued

| Component | Type or Value |
|---|---|
| R2 | Resistor 100K OHM ¼ Watt |
| R3 | Resistor 1K OHM ¼ Watt |
| R4 | Resistor 200K OHM ¼ Watt |
| R5 | Resistor 100K OHM ¼ Watt |
| R6 | Resistor 200K OHM ¼ Watt |
| R7 | Resistor 620K OHM ¼ Watt |
| R8 | Resistor 51K OHM ¼ Watt |
| R9 | Resistor 1M OHM ¼ Watt |
| R10 | Resistor 5.1K OHM ¼ Watt |
| D1–D5 | IN 4001 ¼ Watt |
| C1 | Capacitor .47 MF 50 V |
| C2 | Capacitor .2 MF 200 V |
| Q1 | PNP TRANSISTOR 733 |
| T1 | TRIAC 6 AMP |

When 110 VAC power is applied to the heater through conductors 1 and 2, the voltage at the return junction 3 is nearly 110 VAC, assuming the resistance value of the conductor is significantly less than R1 and R2. For the example of the preferred embodiment, the conductor resistance is 7 OHMS, R1 is 10,000 OHMS and R2 is 100,000 OHMS. With the resistance values of R1 and R2 shown to be in a 10 to 1 ratio, the voltage at junction 6 is about 10 VAC. This voltage half wave rectified through D1 results in a zero to five volt change at 8. More generally the ratio may conveniently be from 8 to 1 up to 12 to 1.

Storage capacitor C1 holds the voltage at 8 near five volts and a resistor R5 provides a current path to ground to drop the voltage when the input voltage is not provided by the voltage divider R1–R2. The value for C1 and R5 are chosen to stabilize the voltage at 8 to near 5 volts and to drop the voltage within a specified time period when the power from the voltage dividers no longer drives the circuit. For the illustrated embodiment the time constant, the time for the capacities to drop to 37% of the voltage, is calculated by the formula TC=R5*C1 or 0.047 seconds. More generally, from 0.04 to 0.06 seconds is suitable for that time constant. This time constant is important in determining the length of time required for the circuit to react to a fault and also the time that passes after the initial power up before the IC can look for the fault. The Safety Circuit input to the IC 14 is at junction 9. With the silicon diode D3 between the IC input 9 and junction 8, a voltage drop of 0.6 volts is expected, therefore, with no break in conductor 1 or 2 a voltage of 5 to 5.6 exists at the IC Safety Circuit input.

For detection of a break in conductor 2, a voltage divider is set up at the return of conductor 2 between R3 and R4. The voltage at junction 7 is sensitive to a break in conductor 2. Junction 7 voltage is held near 1 volts to ground when conductor 2 is continuous by the ratio of resistance values of R3 to R4. When conductor 2 opens as a result of a break, the path to ground now is through R6 and C2, the junction 7 voltage goes high. Resistor R6 and capacitor C2 form a circuit having a time constant given by the formula R6*C2.

The signal is halfwave rectified through D2 and current limited by R8 biasing Transistor Q1 and thus blocking the conduction between the emitter and collector. The voltage at the collector is then drained through R16 and the voltage at 11 declines pulling the safety circuit input voltage low through the forward conduction of Diode D4. In this manner D3 and D4 act as a logical AND gate, the junction 9 will go low, less than 1.5 volts, if junction 8 or junction 11 goes low. The IC will not take protective action if both diodes are at or above 5 volts. The time required to disable the control when conductor 2 breaks is the result of charging C2 through R4 and D2. Upon initial startup the voltage at 7 is high, about 55 volts until the Triac fires connecting the junction to ground through R3. At this time, it will take 5 time constants of the curcuit comprising the resistor R6 and the capacitor C2 for R6 to drop the voltage at 10 before Q1 conducts, for the values shown this would be 100 miliseconds, the waiting period before safe operations can be determined.

Referring to FIG. 2, the IC 14, used for the control of power switching by sending a signal to the Triac T1, is powered by a nominal 5 volt power supply shown as 5.6 volts. More generally that power supply has a stabilized voltage of from 4 to 7 volts. The power setting is input by using momentary switches 15, 16, and 17 for on-off, up and down control. The setting status is displayed by a liquid crystal display 18. In addition to displaying the power or heat setting, the display can indicate an abnormal operating mode by flashing or activating a segment of the display that instructs the user to discontinue use. Similarly an audible alarm can be used to alert the user.

The IC 14 function used to control the temperature of the PTC heater is by time-proportioning the power. For a low temperature setting, for example, the on time may be 2 seconds with a 28 second dwell or off time in a 30 second cycle. The middle setting would have a 15 second on time and a 15 second off time. The highest setting accordingly would provide a 30 second on time or continuous heating. The lowest setting, in this case 2 seconds on, needs to be designed with consideration to the maximum time constants that determine the reaction time of the circuit. The minimum on time may be as low as 1 second and the cycle can conveniently be from a few seconds to a few minutes.

The control of the triac (FIGS. 1 and 3) through its control connection 12 is produced by sequences of unidirectional current pulses respectively bridging zero-crossing instants of the AC wave form, resulting in continuous conduction of the AC wave form, resulting in continuous conduction of the AC through the triac so long as the sequence of control pulses is not interrupted. As noted below, in response to the safety circuit the control pulses, instead of being stopped entirely, may be interrupted for 800 milliseconds only.

In the first embodiment as described previously two seconds is at least ten times the maximum dwell time before the IC is able to detect a fault. Once a fault condition is detected, the signal to fire the Triac is delayed. After the initial fault is detected, a Triac delay time of 800 miliseconds passes and another signal is sent to the Triac requiring 200 miliseconds and if another fault is detected the Triac is again delayed. At this time, a third fault test sequence can be enacted or the Triac signal can be disabled for the entire operation. More generally those periods can be varied safely by at least 25% from the example just mentioned.

To further assure the detection of the fault 200 miliseconds after the next cycle begins the IC reads the Safety Circuit input signal and if the fault is detected, the triggering of the Triac is again by-passed and the drive for the LCD display is switched into a blinking mode. To avoid further hazardous use especially in an unattended situaton, a repetitive fault occurrence would cause the unit to turn off. Repetitive interaction by the user to turn off and turn on would only cause the display to blink since the fault condition can be stored in memory.

At this time, the only way power would go to the faulty heater is if the user disconnected the power cord from the receptacle and again inserted the power plug into the receptacle. By repowering the controller, the first 200 miliseconds of heating would again look for the fault and the detection cycle would repeat again disabling the power to the heater.

The IC function can also improve the reliablity of the disconnect feature in the event of a short circuit that would result from the contact of conductors 1 and 2. Referring again to FIG. 1, the fuse 5 may be sized for lower currents and shorter time and avoid the extreme inrush currents, up to seven times the operating currents, by pulsing the power to the heating element in the first few seconds. For example, by only allowing a 10% to 30% duty cycle in the first five to ten seconds the continuous current would then be 1 ampere instead of 5 amperes when a cold element is first heated. After the first few critical seconds, a preheat cycle of continuous operation can be enacted to quickly raise the temperature to the desired setting.

In a second embodiment redundant Safety Control can be achieved by including a second switching device in series with the Triac. FIG. 3 shows this combination where even if a Triac fails in the closed position complete control is achieved by the second Triac T2. Both switching devices are simultaneously fired by either the same signal or respectively by separate signals sent by the IC 26. The Safety Circuit is composed of discrete components, diodes resistors, capacitors and a transistor operating off low current. It may be beneficial to use diodes having higher power capabilites such as IN 4001 instead of the small signal switching type that is commonly used to handle the loads associated with this type of circuit. In design careful consideration of component tolerances is important, especially relating to the capacitors and resistors that determine the charging and discharging time.

Figure 4:
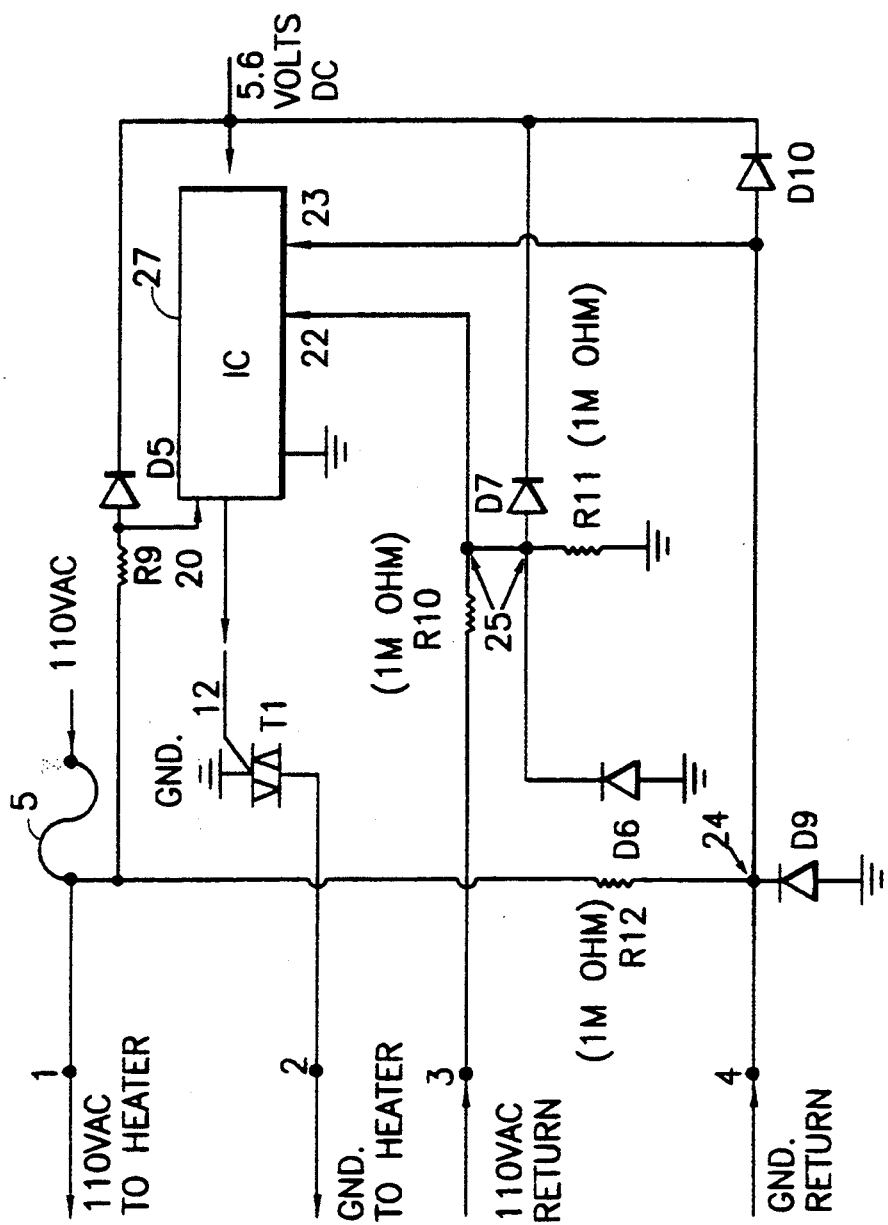
FIG. 4 is a circuit diagram if a first version of the preferred embodiment with two safety circuit inputs to the IC.

A first version of the preferred embodiment of the safety circuit invention is shown in FIG. 4. The principal of this preferred embodiment is based on a dual signal input to the IC and a comparitave analysis of the two signals to determine if safe operation is to continue. Unlike the circuits of FIG. 1 and FIG. 3 there is no dependance on time constants and the time to detect a fault is nearly instantaneous, in fact within one half AC cycle if necessary. The 110 VAC return signal at pin 3 connects to junction 25 through a current limiting resistor R10 having a resistance of 1 Meg OHM. The junction 25 voltage is clamped to the dc supply voltage by diode D6. The junction 25 signal, a 60 Hz pulse is input to the IC at 22. If the conductor between 1 and 3 breaks then R11 rapidly provides a current path to ground and the signal to the IC at 22 is then ground. Resistor R11 is on the order of 1 Meg OHMS. The IC is therefore expecting a 5 volt 60 Hz pulse at the input 22 to continue the firing of the Triac. A second signal directly connected to the ground return at pin 4 is input to the IC at 23. Connected between the ground return at 4 and the AC 110 v power input is a 1 Meg OHM resistor R12.

With the ground wire continuous within the heater, between pin 2 and 4, the signal to the IC at 23 is ground. If a break occurs in the ground conductor then the signal from 110 VAC through the current limiter R12 is clamped to the 5.6 volt DC input by Diode D10 for AC Phase angles 0° to 180° and is clamped to ground through D6 for the AC half wave between 180° and 360°. The IC input at 23 is expected to be ground, if a 60 Hz pulse is detected then a fault in the heater ground conductor has occured.

Figure 5:
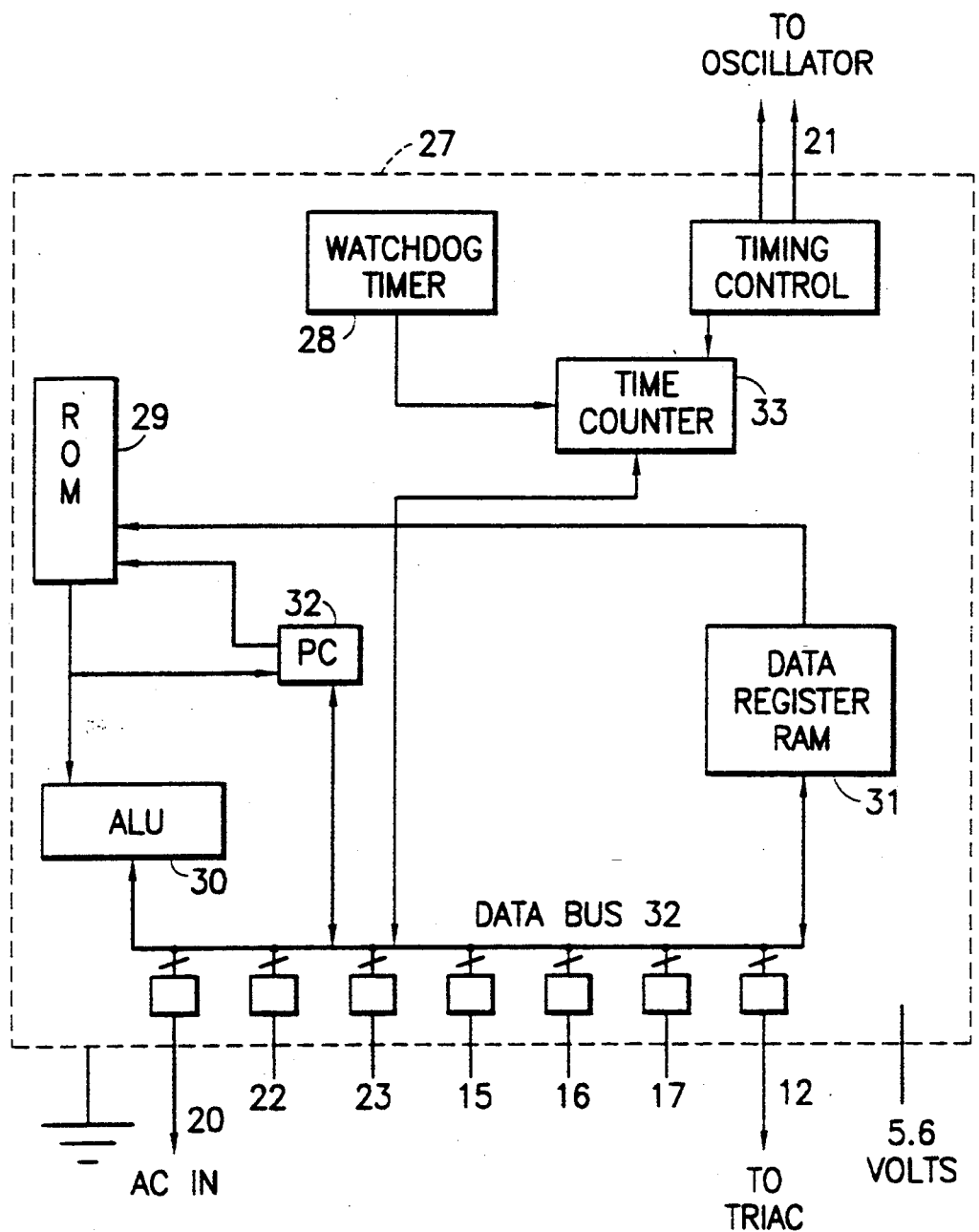
FIG. 5 is a block diagram of the microcontroller IC 27 of FIG. 4.

The micro controller IC, FIG. 5 includes Read Only Memory "ROM" 29 where the algorithims and instruction set that comprise the program to control the heating and the display are stored. The instructions from ROM are processed within the Arithmetic Logical Unit "ALU" 30 and the resulting values are decoded and stored in a data register as Randam Access Memory "RAM" 31 to be used as input to the program. The input signals, AC in, safety circuit inputs 22 and 23, and the control inputs 15, 16 and 17, are received through the data bus 32. The program determines when power is to be supplied based on the input from the safety circuit and the control status. The Triac firing is coordinated with the AC wave form input to the IC through the AC in port 20 to trigger the Triac at the zero crossing. A program counter "PC" 32 is required to keep track of the program steps and index to the next program instruction.

A timing circuit 21 serves to control the clock speed at which the program operates is made up of a typical of an RC oscillator. A crystal oscillator can also be used. Typically the clock speed is in the order of 1 to 2 million cycles per second. The watchdog timer is set to overload periodically which initiates a device reset, upon reset the program is initialized and starts from the beginning. The watchdog timer 28 intermittently times out the microprocessor operation for a preset period, adjustable between 0.01 and 3 seconds. The time counter 33 and program counter 32 are also reset. If a lock up occurs, the watchdog timer, having its own internal oscillator, will continue to countdown and then reset the program. The timeout mode is also enacted upon power up to assure the proper voltage is input to the microprocessor, thus allowing the power circuit time to stabilize. The watchdog timer is important to guarantee the processing of the safety circuit signal. It may also reset the microprocessor in all situations involving noise pulses that may corrupt memory or cause a lock-up. While in the heating cycle, the IC produces an output signal at port 12 that triggers the Triac AC connecting to the heater. The output signal 12 controls the firing of the triac. OKI Co. device number MSM64162 is one example of a micro controller IC that can perform the functions as stated above.

The AC Power input and the Triac Trigger Signal for the embodiment of FIG. 4 is shown in FIG. 6, the signal time period is 60 Hz 10 cycles. For the same time frame, FIG. 7 shows the possible combination of signals that will be input to the IC for determination of safe operation. Referring to FIG. 7A the 60 Hz pulse at pin 22 and ground at 23 FIG. 7A is the signal combination required for safe operation. FIG. 7B shows the signals at 22 and 23 when a break in the heater ground conductor has occured. FIG. 7C is the signal combination resulting from a break in the heater 110 v conductor. The feedback signals of FIG. 7D would be expected when both the 110 VAC and the ground heater conductors are open, this typically occurs if the heater is not connected to the controller. The signal analysis of groups FIG. 7B and 7C and 7D would result in the interruption of the Triac Trigger Signal 12, shown in FIG. 6 and thus the interruption of the 110 VAC power to the heater. In the case of 7B and 7C, this power interruption will prevent the PTC material from arcing and causing a fire, for the open circuit condition of 7D when the user has not yet plugged in the heater, the power interruption eliminates the possibility of electric shock from touching the plug or receptical.

Figure 8:
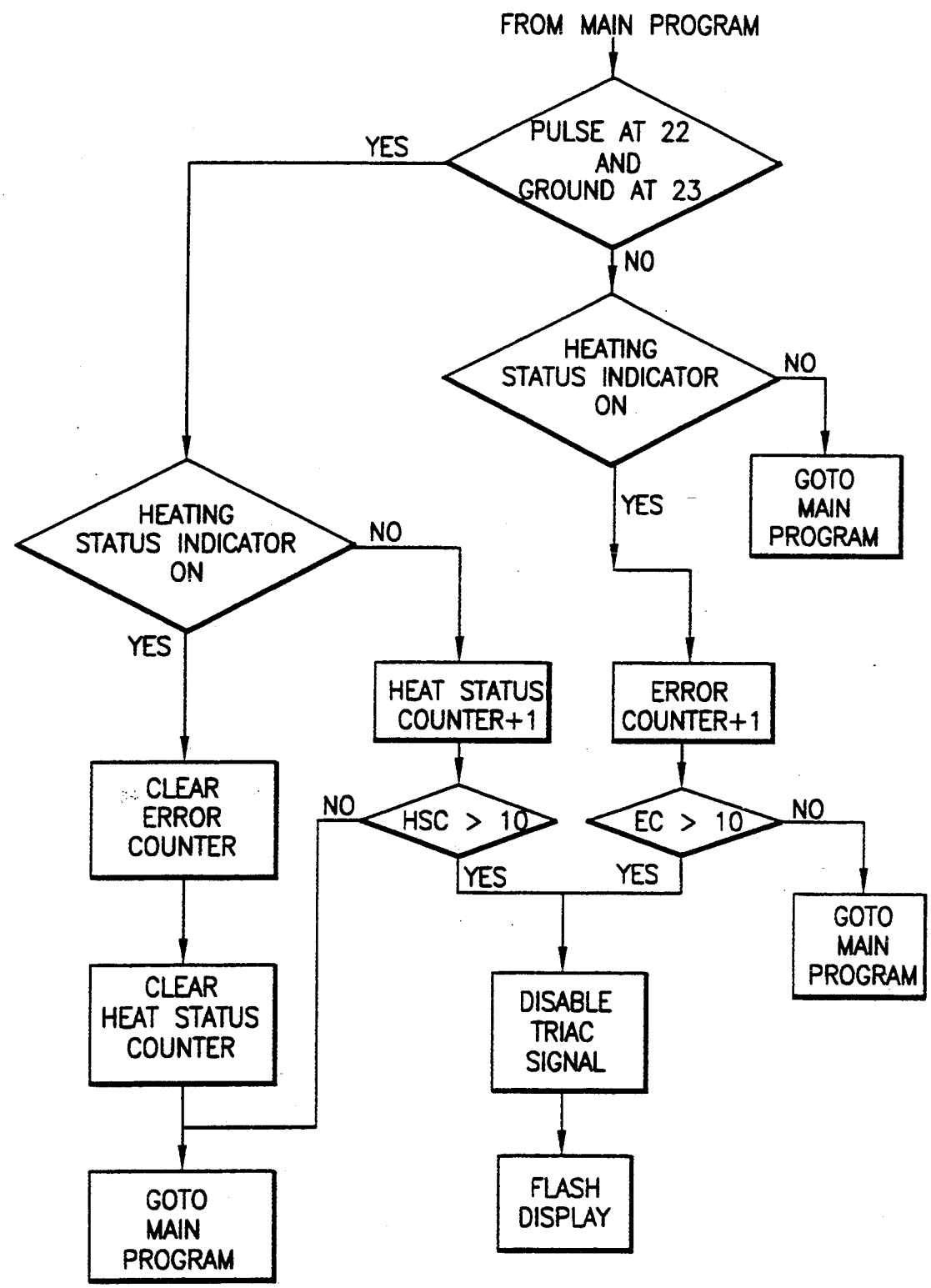
FIG. 8 is a flow chart of the program of the microprocessor shown in FIG. 5.

The program, stored in the ROM section 29 of the IC 27, has a routine to analyze the feedback signals 22 and 23. Referring to the routine flow chart of FIG. 8 the first instruction looks for the safe signal, FIG. 7A. If the pulse is detected at port 22 and ground is detected at 23 then the result at the first stage is Yes and the next instruction is to verify that the heating cycle is on. If the Triac has failed in the short circuit condition and heating is in the off mode then a No answer to the heating status indication routs the program to the Heat Status Counter "HSC" sub routine. The HSC sub routine adds one to the HSC value then compares the value to 10. If the count is over 10 then 10 consecutive cycles indicate Triac Failure and the sub routine is routed to fault protection and alarm routine. If the Heating Status Indicator is on then normal operation is occurring and the Error Counter and the Heating Status Counter are set to zero and the routine goes back to the main program. At the first stage if the pulse is not detected at 22 or a pulse exists at 23 then the answer is No and if the Heating Status is on, then an error condition exists that would indicate an unsafe operating condition, at this point the error counter is indexed by one and in ten cycles, approximately 87 miliseconds, the subroutine is routed to the fault safety routine disabling the Triac, flashing the display, flashing an indicator light or sounding an alarm. The error count is set at 10 for example to react to a fault in 87 miliseconds, the count can be smaller if a quicker reaction is required. The count should not be as small as one in order to prevent nuisance failures that may result from power fluctuation.

Figure 9:
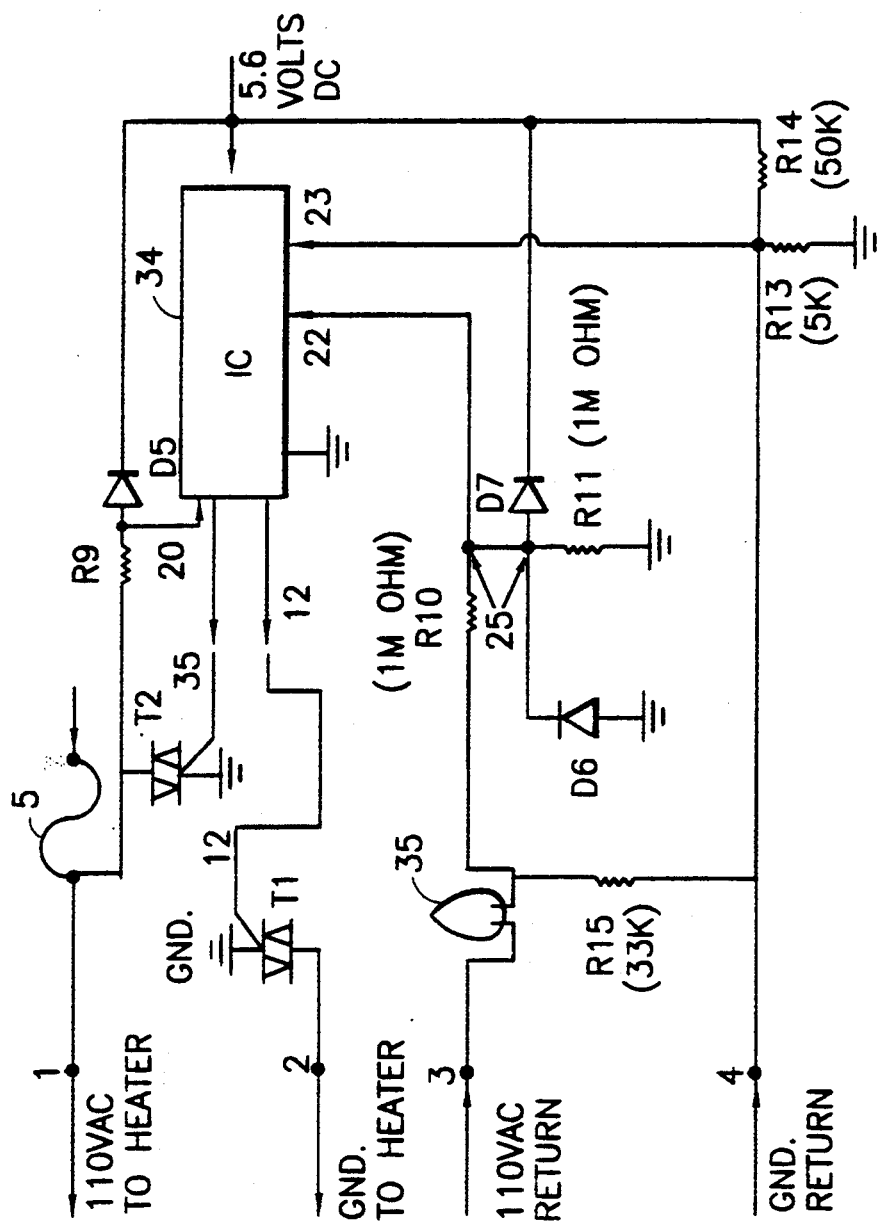
FIG. 9 is a circuit diagram of a second version of the preferred embodiment in which one input to the IC 27 has a D.C. characteristic and the other has a pulsed signal.

A second version of the preferred embodiment with a dual signal safety circuit feedback is shown in FIG. 9. The 110 V return circuit is the same as described in FIG. 4 producing a 60 cycle pulse for input to the IC at port 22. The ground return from pin 4 is connected to the junction of a voltage divides between ground and the 5.6 volt DC supply. When the ground conductor through the heater is continuous then this conductor shorts the junction to ground and the second feedback signal to the IC at 23 is ground, the same condition as the circuit of FIG. 4. The safe operating signal configuration is the same as FIG. 7A. In the event of a broken or open ground heater conductor then the junction between resistors R13 and R14 is no longer shorted to ground, the voltage divider becomes active and the junction voltage is 5 volts. The error condition for the signal input to port 23 is now 5 volts (in pulses) and the safe condition is ground potential, as in the previous example of FIG. 4. When arcing occurs, resulting from a conductor break, the high local temperature of the arc or spark will cause the PTC material to burn and form carbon in the area surrounding the arc. The carbon path created by the arcing condition can conduct current that will produce a lower level AC signal at 3. To prevent this lower voltage signal from generating the pulsed signal at junction 25 and to prevent input to the IC at 22, a voltage breakover device 35 is placed in series with the 110 VAC return conductor between 3 and R10. Resistor R15 provides a current path to ground and is sized to allow the current and voltage across 35 to be just over its threshold voltage when the input AC voltage is at the lowest rated voltage, as for example 100 volts. The breakover device 35 shown in this embodiment is a mineature neon bulb having a minimum breakdown voltage, the voltage to turn on, of 80 volts. Xenell Co. in Oklahoma, part #A1E, can be used for this purpose. With the current limiting resistor R15 attached to the ground return the lamp 35 is only on when the Triac T1 is firing and will act as a heat indicator light, if the current limiting resistor were attached to the common ground the lamp would be on during the off cycle as well as the on cycle and can have the dual function of providing backlighting for the display.

Figure 10:
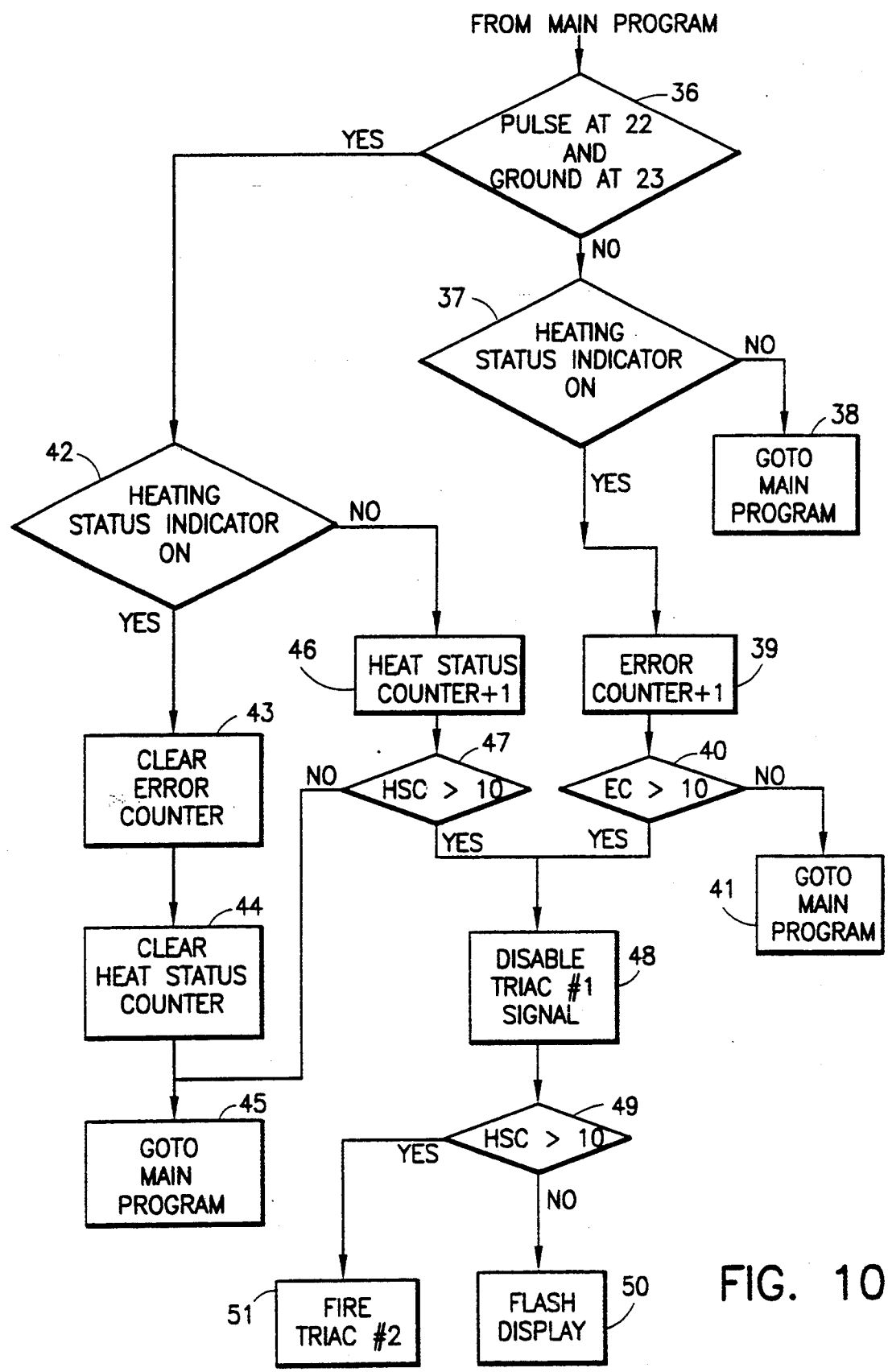
FIG. 10 is a flow chart of the program of the microprocessor shown in FIG. 9.

A second Triac T2 can be used to disable (the controller permanently) in the event of the Control Triac T1 failing in the short circuit condition. The circuit for the control disablement is of the common crowbar type that for a short duration connects ground across the fuse 5, a current limiting resistor "not shown" can be used to prevent the surge current from causing damage to the internal wiring of a house or the firing sequence for Triac T2 can be time proportioned to limit current and accomplish the blowing of the fuse 5 within a specific period of time, for example, 200 miliseconds. The program routine, FIG. 10, is the same as FIG. 8 for the sequence stages 36 through 48. Stage 49 compares the Heat Status Counter to 10 as in stage 47 only this time if it is over 10 then the next program sequence is the Triac 2 firing routine that disables the unit. If at stage 49, the HSC is not greater than 10, then the error condition is not a result of the Triac 1 T1 failing closed and the routine is directed to the stage 50 that will flash the display after disabling the Triac 1 signal.

The circuits of FIGS. 1 through 10 illustrate the principles of the invention and it will accordingly be recognized that the application of the principles of the invention variations and modifications are possible in many respects.

By application of the principles of the invention discribed herein, other applications will become apparent to those skilled in the art. No limitations are intended or implied herein, other than those of the appended claims.

We claim:

1. A safety circuit for an electric alternating-current heater, said heater having a heating element provided by a web of PTC electroresistive material extending between first and second heater feed conductors, said first heater feed conductor (1) being connectable through a protecting fuse (5) to an ungrounded pole of a source of alternating electric current and said second heater feed conductor being connectable through a heater switch (T1) to a grounded pole of said source of alternating electric current, said first and second heater feed conductors, at their respective ends remote from said fuse and from said heater switch, being respectively connected to first and second safety link return conductors leading respectively to first (3) and second (4) inputs of said safety circuit, said heater switch being a triac having a control input, connected to an output of an integrated circuit (IC) unit, for duty cycle time division control of said triac through said control input of said triac in a duty cycle range varying from at most 25% duty to 100% in response to heat settings and in response to an output of said safety circuit connected to a control input of said integrated circuit unit, said integrated circuit unit being supplied with d.c. power at a reference voltage by d.c. power supply means connected to said source of alternating electric current, said integrated circuit unit also having manual control means for controlling said heater, said safety circuit comprising:

a first resistive voltage divider (R1, R2) having a tap connection and a greater and a smaller resistance respectively on opposite sides of said tap connection and connected between the end of said second heater feed conductor (2) which end is connected to said heater switch (T1) and the end of said first safety link return conductor which is remote from its connection to said first heater feed conductor;

a second resistive voltage divider having a tap connection and a greater and a smaller resistance respectively on opposite sides of said tap connection and connected between the end of said first heater feed conductor (1) which end is connected to said fuse (5) and the end of said second safety link conductor (4) which end is remote from its connection to said second heater feed conductor (2), the greater of said resistances of each of said first and second voltage dividers being connected respectively to said first safety link return conductor and to said first heater feed conductor, the ratio of said greater to said smaller resistance being greater for said second voltage divider than for said first voltage divider;

a first rectifier diode (D1) having a first electrode connected to said tap of said first voltage divider and a second electrode connected to a first network comprising a first capacitor (C1) shunted by a resistor (R5) leading to ground potential, said first network having a first predetermined time constant;

a second rectifier diode (D2) having a first electrode connected to said tap of said second voltage divider and a second electrode connected to a second network comprising a second capacitor (C2) shunted by another resistor (R6) leading to ground potential, said second network having a second time constant;

said connection of said first rectifier (D1) to said first capacitor (C1) also being connected, through a third diode (D3), poled oppositely to said first diode (D1) in a series connection therewith interposed between said first diode and said control input of said integrated circuit unit;

a semi-conductor inverting amplifier stage having a first main path electrode connected to said reference voltage, having a control electrode connected, through an input resistor (R8) to said second diode (D2) where said second diode is connected to said second capacitor (C2), for blocking conduction between main path electrodes of said amplifier stage by a signal rectified by said second diode (D2) and having a second main path electrode connected both to a load resistor (R10) leading to ground potential and, through a fourth diode (D4), to said control input (9) of said integrated circuit (IC) unit (14), the polarity of said fourth diode (D4) being opposite to that of said third diode (D3) when said third and fourth diodes are considered as being in series through their common connection and being the same as the polarity of said third diode when said third and fourth diodes are considered as respectively belonging to parallel paths to ground through respective resistances (R5, R10);

wherein said first and second networks serve to make a time that passes after initial power up of said heater before said integrated circuit unit can respond to a fault substantially equal to a time necessary for both the safety circuit and the integrated circuit (IC) unit to react to a fault.

2. The safety circuit of claim 1 wherein a predetermined minimum value of said duty cycle is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

3. The safety circuit of claim 1 wherein said first network and said second network each have a time constant not less than 0.04 sec. and not greater than 0.06 sec.

4. The safety circuit of claim 2 wherein said first network and said second network each have a time constant not less than 0.04 sec. and not greater than 0.06 sec.

5. The safety circuit of claim 1, wherein said first voltage divider has a ratio between 8% and 12% said second voltage divider has a ratio between 0.3% and 0.7% and wherein the overall resistance of said second voltage divider is at least 50% greater than the overall resistance of said first voltage divider.

6. The safety circuit of claim 2, wherein said first voltage divider has a ratio between 8% and 12%, said second voltage divider has a ratio between 0.3% and 0.7% and wherein the overall resistance of said second voltage divider is at least 50% greater than the overall resistance of said first voltage divider.

7. A safety-assuring control device for an electric alternating-current heater, said heater having a heating element provided by a web of PTC electroresistive material extending between first and second heater feed conductors, said first heater feed conductor (1) being connected to a protecting fuse (5) and connectable therethrough to an ungrounded pole of a source of alternating electric current and said second heater feed conductor (2) being connected to an electrically controlled heater switch (T1) and connectable therethrough to a grounded pole of said source of alternating electric current, said first and second heater feed conductors, at respective ends remote from said fuse and from said heater switch, being respectively connected to first and second safety link return conductors which lead respectively towards first and second connections to said control device, said control device comprising an integrated circuit unit (14) having means for cyclically varying the on time of said heater switch in consecutive equal periods of a constant major fraction of a minute from an on time of a few second stepwise to a continuous on time, a safety circuit connected to said first and second safety link return conductors and to an input (9) of said integrated circuit unit (14) and a source of a direct current supplied at a steady potential more than 4 volts and less than 7 volts from ground potential, connected to an input of said integrated circuit unit (14) and to said safety circuit, said electrically controlled heater switch is a triac having control connections means (12);

said integrated circuit unit (14) has a safety circuit input, an input connected with said source of direct current, as well as least one heat setting input (15, 16, 17) connected to heat setting means, a grounding connection, an input (20) for voltage of said electric alternating current and an output connected to said control connection means (12) of said triac and is programmed for control of said means for cyclically varying the on time of said heater switch in response to said heat setting means and to said safety circuit and for otherwise interrupting or shutting off said heater switch in response to occasional input from said safety circuit, a first resistive voltage divider (R1,R2) having a tap connection and a greater and a smaller resistance respectively on opposite sides of said tap connection and connected between the end of said second heater feed conductor (2) which end is connected to said heater switch (T1) and the end of said first safety link return conductor which is remote from its connection to said first heater feed conductor;

a second resistive voltage divider having a tap connection and a greater and a smaller resistance respectively on opposite sides of said tap connection and connected between the end of said first heater feed conductor (1) which end is connected to said fuse (5) and the end of said second safety link conductor (4) which end is remote from its connection to said second heater feed conductor (2), the greater of said resistances of each of said first and second voltage dividers being connected respectively to said first safety link return conductor and to said first heater feed conductor, the ratio of said greater to said smaller resistance being greater for said second voltage divider than for said first voltage divider;

a first rectifier diode (D1) having a first electrode connected to said tap of said first voltage divider and a second electrode connected to a first network comprising a first capacitor (C1) shunted by a resistor (R5) leading to ground potential, said first network having a first predetermined time constant;

a second rectifier diode (D2) having a first electrode connected to said tap of said second voltage divider and a second electrode connected to a second network comprising a second capacitor (C2) shunted by another resistor (R6) leading to ground potential, said second network having a second time constant;

said connection of said first rectifier (D1) to said first capacitor (Cl) also being connected, through a third diode (D3), poled oppositely to said first diode (D1) in a series connection therewith interposed between said first diode and said control input of said integrated circuit (IC) unit;

a semi-conductor inverting amplifier stage having a first main path electrode connected to said reference voltage, having a control electrode connected, through an input resistor (R8) to said second diode (D2) where said second diode is connected to said second capacitor (C2), for blocking conduction between main path electrodes of said amplifier stage by a signal rectified by said second diode (D2) and having a second main path electrode connected both to a load resistor (R16) leading to ground potential and, through a fourth diode (D4), to said control input of said integrated circuit unit, the polarity of said fourth diode (D4) being opposite to that of said third diode (D3) when said third and fourth diodes are considered as being in series through their common connection and being the same as the polarity of said third diode when said third and fourth diodes are considered as respectively belonging to parallel paths to ground through respective resistances (R5,R16);

whereby at low voltage at said input (9) of said integrated circuit unit (14) causes a shutting off of said heater switch at least for a predetermined period and wherein said first and second networks serve to make a time that passes after initial power-up of said heater before said integrated circuit unit can respond to a fault substantially equal to a time necessary for both the safety circuit and the integrated circuit unit to react to a fault.

8. The safety-assuring control device of claim 7 wherein a predetermined minimum non-zero value of said on time of said heater switch in consecutive equal periods is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

9. The safety-assuring control device of claim 7, wherein said integrated circuit unit (14) is programmed to provide a duty cycle period not exceeding one minute in which variable on-time has a minimum duration of at least one second and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

10. The safety-assuring control device of claim 8, wherein said integrated circuit unit (14) is programmed to provide a duty cycle period not exceeding one minute in which variable on-time has a minimum of at least one second duration and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

11. The safety-assuring control device of claim 7 wherein said integrated circuit unit is programmed to respond, after a triac turn off for a major fraction of a second in response to an initial fault detection, by again reading a signal at said safety circuit input (9) of said integrated circuit unit and if a fault is again detected, the turn on of the triac is again blocked and an LCD display is switched into a blinking mode.

12. The safety-assuring control device of claim 8 wherein said integrated circuit unit is programmed to respond, after a triac turn off for a major fraction of a second in response to an initial fault detection, by again reading a signal at said safety circuit input (9) of said integrated circuit unit and if a fault is again detected, the turn on of the triac is again blocked and an LCD display is switched into a blinking mode.

13. The safety-assuring control device of claim 7, wherein said d.c. power supply means provides d.c. power at an electro-positive reference voltage with respect to ground potential.

14. The safety-assuring control device of claim 8 wherein said d.c. power supply means provides d.c. power at an electro-positive reference voltage with respect to ground potential.

15. The safety-assuring control device of claim 7, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

16. The safety-assuring control device of claim 8, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

17. A safety-assuring control device for an electric alternating-current heater, said heater having a heating element provided by a web of PTC electroresistive material extending between first and second heater feed conductors, said first heater feed conductor (1) being connected to a protecting fuse (5) and connectable therethrough to an ungrounded pole of a source of alternating electric current and said second heater feed conductor being connected to an electrically controlled heater switch (T1) and connectable therethrough to a grounded pole of said source of alternating electric current, said first and second heater feed conductors, at respective ends remote from said fuse and from said heater switch, being respectively connected to first and second safety link return conductors which lead respectively towards connections to said control device, said control device comprising an integrated circuit unit having a read-only memory, a program counter, an arithmetic logic unit and, a random access memory, and a data bus interconnecting at least said arithmetic logic unit, said program counter, said random access memory and a time counter, said read-only memory being connected to said program counter, said arithmetic logic unit and said random access memory, wherein:

said electrically controlled heater switch is a triac having control connections means (12);

said integrated circuit unit (27) has first and second safety circuit inputs (22,23) and an input connected with a source of direct current supplied at steady potential more than 4 volts and less than 7 volts from ground potential, as well as least one heat setting input (15,16,17), a grounding connection, an input (20) for voltage of said electric alternating current and an output connected to said control connection means (12) of said triac;

said second safety link return conductor, at its end adjacent to said control device, is clamped to ground to ground potential in a first polarity and to said steady d.c. potential in a second polarity, opposite to said first polarity, by respective diodes (D9,D10), is connected to a first current limiting resistor (12) leading to the connection of said fuse with said first heater feed conductor and, is connected to said second safety circuit input (23) of said integrated circuit unit (27); and said first safety link return conductor, at its end adjacent to said control device, is connected, at least after an applied initial voltage drop exceeding 50 volts, to a second current limiting resistor (10) leading to a junction (25) which, in addition to being connected to said second current limiting resistor, is connected to a third current limiting resistor (11) which leads to ground potential, said junction being clamped to ground in said first polarity and to said steady d.c. potential in said second polarity by respective diodes (D6,D8) said junction being connected to said first safety circuit input (23) of said integrated circuit unit through a diode for selecting half cycles of alternating voltage corresponding to said alternating electric which are of a predetermined polarity;

said input (20) of said integrated circuit unit (27) for voltage of said electric alternating current being clamped by a diode (D5) to said steady d.c. potential and connected through a fourth current limiting resistor (R9) to said first heater feed conductor at or near its connection to said fuse (5), and said integrated circuit unit being programmed by its read-only memory to enable said triac to conduct alternating current continuously or periodically so long as a.c. power frequency pulses going from ground potential to approximately said potential of said source of direct current are supplied to said first safety circuit input (22) of said integrated circuit unit while the potential at said second safety circuit input (23) of said integrated circuit unit remains within a predetermined voltage, less than one volt, from ground potential and to disable said triac for at least half a second when a.c. power frequency pulses going to approximately said potential of said source of direct current are supplied to said second safety circuit input (23) of said integrated circuit unit and likewise when the potential at said first safety circuit input (22) remains within said predetermined voltage, less than one volt, from ground potential.

18. A safety-assuring control device for an electric alternating-current heater, said heater having a heating element provided by a web of PTC electroresistive material extending between first and second heater feed conductors, said first heater feed conductor (1) being connected to a protecting fuse (5) and connectable therethrough to an ungrounded pole of a source of alternating electric current and said second heater feed conductor being connected to an electrically controlled heater switch (T1) and connectable therethrough to a grounded pole of said source of alternating electric current, said first and second heater feed conductors, at respective ends remote from said fuse and from said heater switch, being respectively connected to first and second safety link return conductors which lead respectively towards connections to said control device, said control device comprising an integrated circuit unit having a read-only memory, a program counter, an arithmetic logic unit and, a random access memory, and a data bus interconnecting at least said arithmetic logic unit, said program counter, said random access memory and a time counter, said read-only memory being connected to said program counter, said arithmetic logic unit and said random access memory, wherein:

said integrated circuit unit (34) has first and second safety circuit inputs (22,23) and an input connected with a source of direct current supplied at steady potential more than 4 volts and less than 7 volts form ground potential, as well as least one heat setting input (15,16,17), a grounding connection, an input (20) for voltage of said electric alternating current and an output connected to said control connection means (12) of said triac;

said second safety link return conductor, at its end adjacent to said control device, is connected to said second safety circuit input (23) of said integrated circuit unit (27) and is connected to the tap connection a resistive voltage divider (R13,R14) connected from ground potential to said d.c. potential so as to put said tap connection at no more than 1 volt from ground potential; and said first safety link return conductor, at its end adjacent to said control device, is connected, at least after an applied initial voltage drop exceeding 50 volts, to a first current limiting resistor (10) leading to a junction (25) which, in addition to being connected to said first current limiting resistor, is connected to said first safety circuit input (23) of said integrated circuit unit and is connected to a second current limiting resistor (11) which leads to ground potential, said junction being clamped to ground potential in a first polarity and to said steady d.c. potential in a second polarity, opposite to said first polarity, by respective diodes (D6,D7);

said input (20) of said integrated circuit unit (27) for voltage of said electric alternating current being clamped by a diode (D5) to said steady d.c. potential and connected through a third current limiting resistor (R9) to said first heater feed conductor at or near its connection to said fuse (5), and said integrated circuit unit being programmed by its read-only memory to enable said triac to conduct alternating current continuously or periodically so long as a.c. power frequency pulses going from ground potential to approximately said potential of said source of direct current are supplied to said first safety circuit input (22) of said integrated circuit unit while the potential at said second safety circuit input (23) of said integrated circuit unit remains within a predetermined voltage, less than one volt, from ground potential and to disable said triac for at least half a second when a.c. power frequency pulses going to approximately said potential of said source of direct current are supplied to said second safety circuit input (23) of said integrated circuit unit and likewise when the potential at said first safety circuit input (22) remains within said predetermined voltage, less than one volt, from ground potential.

19. The safety-assuring control device of claim 17, wherein a predetermined minimum value of said duty cycle is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

20. The safety-assuring control device of claim 18, wherein a predetermined minimum value of said duty cycle is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

21. The safety-assuring control device of claim 17, wherein said integrated circuit unit (27) is programmed to provide a duty cycle not exceeding one minute in which variable on-time has a minimum duration of at least one second and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

22. The safety-assuring control device of claim 18, wherein said integrated circuit unit (27) is programmed to provide a duty cycle not exceeding one minute in which variable on-time has a minimum duration of at least one second and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

23. The safety-assuring control device of claim 17 wherein said integrated circuit unit is programmed to respond, after a triac turn off for a major fraction of a second in response to an initial fault detection, by again reading signals at safety circuit inputs of said integrated circuit unit and if the fault is again detected, the turn on of the triac is again blocked and an LCD display is switched into a blinking mode.

24. The safety-assuring control device of claim 8 wherein said integrated circuit unit is programmed to respond, after a triac turn off for a major fraction of a second in response to an initial fault detection, by again reading signals at safety circuit inputs of said integrated circuit unit and if the fault is again detected, the turn on of the triac is again blocked and an LCD display is switched into a blinking mode.

25. The safety-assuring control device of claim 17 wherein said integrated circuit unit includes an independently running counter connected for resetting said integrated circuit unit to a predetermined place in a program for controlling operations of said integrated circuit unit at regular intervals.

26. The safety-assuring control device of claim 18 wherein said integrated circuit unit includes an independently running counter connected for resetting said integrated circuit unit to a predetermined place in a program for controlling operations of said integrated circuit unit at regular intervals.

27. The safety-assuring control device of claim 17, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

28. The safety-assuring control device of claim 18, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

29. The safety-assuring control device of claim 19, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

30. The safety-assuring control device of claim 20, wherein said heater switch comprises first and second triacs (T1,T2) each having a control input connected to an individual output of said integrated circuit unit, said first triac (T1) being connected to said second heater feed conductor and to said second triac (T2) and said second triac (T2) being connected to said grounded pole of said source of alternating electric current, and wherein said integrated circuit unit is programmed for switching on both of said triacs simultaneously through their respective control inputs, whereby if a triac fails to respond to a turn off condition at its control input, the turn off is nevertheless accomplished by the other triac.

31. The safety-assuring control device of claim 17, wherein said d.c. power supply means provides d.c. power at an electro-positive reference voltage with respect to ground potential.

32. The safety-assuring control device of claim 18, wherein said d.c. power supply means provides d.c. power at an electro-positive reference voltage with respect to ground potential.

33. The safety-assuring control device of claim 17, wherein said connection of said first safety link return conductor, at its end adjacent to said control device is through a break-over device having a minimum breakdown turn-on voltage which is greater than 50 volts, said break-over device having a first electrode connected to said first safety link return conductor and a second electrode connected to said second current limiting resistor (10).

34. The safety-assuring control device of claim 18, wherein said connection of said first safety link return conductor, at its end adjacent to said control device is through a break-over device having a minimum breakdown turn-on voltage which is greater than 50 volts, said break-over device having a first electrode connected to said first safety link return conductor and a second electrode connected to said first current limiting resistor (12).

35. The safety-assuring control device of claim 33, wherein said break-over device comprises a bulb containing a gas capable of being ionized by an electrical field and wherein a leak resistor having less resistance than said second current-limiting resistor (10) is connected between said second electrode of said break-over device and said second safety link return conductor.

36. The safety-assuring control device of claim 34, wherein said break-over device comprises a bulb containing a gas capable being ionized by an electrical field and wherein a leak resistor having less resistance than said first current-limiting resistor (12) is connected between said second electrode of said break-over device and said second safety link return conductor.

37. The safety-assuring control device of claim 35, wherein a predetermined minimum value of said duty cycle is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

38. The safety-assuring control device of claim 36, wherein a predetermined minimum value of said duty cycle is made effective by said integrated circuit unit at said control input of said triac in initial startup to reduce the initial average current for a predetermined initial time interval so that said fuse (5) can be selected without regard to inrush current values that might otherwise occur and wherein said triac is fired in consecutive cycles of said alternating electric current of said alternating electric current source immediately after each null voltage transition of said consecutive alternating electric current cycles.

39. The safety-assuring control device of claim 35, wherein said integrated circuit unit (27) is programmed to provide a duty cycle not exceeding one minute in which variable on-time has a minimum duration of at least one second and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

40. The safety-assuring control device of claim 36, wherein said integrated circuit unit (27) is programmed to provide a duty cycle not exceeding one minute in which variable on-time has a minimum duration of at least one second and the duty cycle varies from at most 10% to full on, and wherein said integrated circuit unit is able to detect a voltage designating a fault reported by said safety circuit in substantially less than 0.2 sec., and wherein said integrated circuit unit is programmed from an initial detection of said voltage to interrupt the pulses necessary for keeping the triac heater switch in its on condition for a major fraction of a second instead of turning the triac off entirely, and wherein, after at least one interruption for a major fraction of a second, the detection of another fault reported by said safety circuit results in turning off said triac heater switch indefinitely.

41. The safety-assuring control device of claim 35 wherein said integrated circuit unit is programmed to respond, after a triac turn off for a major fraction of a second in response to an initial fault detection, by reading again safety circuit input signal and if the fault is again detected, the turn on of the triac is again blocked and an LCD display is switched into a blinking mode.

42. The safety-assuring control device of claim 36 wherein said integrated circuit unit is programmed to respond, after a triac turn off for a major fraction of a second in response to an initial fault detection, by reading again safety circuit input signal and if the fault is again detected, the turn on of the triac is again blocked and an LCD display is switched into a blinking mode.

43. The safety-assuring control device of claim 35 wherein said integrated circuit unit includes an independently running counter connected for resetting said integrated circuit unit to a predetermined place in the program of said integrated circuit unit at regular intervals.

44. The safety-assuring control device of claim 36 wherein said integrated circuit unit includes an independently running counter connected for resetting said integrated circuit unit to a predetermined place in the program of said integrated circuit unit at regular intervals.

45. The safety-assuring control device of claim 35, wherein said d.c. power supply means provides d.c. power at an electro-positive reference voltage with respect to ground potential.

46. The safety-assuring control device of claim 36, wherein said d.c. power supply means provides d.c. power at an electro-positive reference voltage with respect to ground potential.

47. The safety-assuring control device of claim 17, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

48. The safety-assuring control device of claim 18, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

49. The safety-assuring control device of claim 35, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 m and less than 17, and when said predetermined number of said turn-off commands is reached, said second triac is turned on for blowing said fuse (5) and thereby disabling the heater.

50. The safety-assuring control device of claim 36, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

51. The safety-assuring control device of claim 37, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

52. The safety-assuring control device of claim 38, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

53. The safety-assuring control device of claim 39, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

54. The safety-assuring control device of claim 40, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

55. The safety-assuring control device of claim 41, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

56. The safety-assuring control device of claim 42, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

57. The safety-assuring control device of claim 43, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

58. The safety-assuring control device of claim 44, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

59. The safety-assuring control device of claim 45, wherein a second triac (T2), having a control input, is connected between the junction of said first heater feed conductor (1) and said fuse (5) and ground potential and has its control input connected to a second control output of said integrated circuit unit (27) and wherein said integrated circuit unit is programmed to count the number of turnoffs of turn-off commands for the triac (T1) of said electrically controlled heater switch and to compare the count number with a predetermined number which is at least 3 and less than 17, and when said predetermined number of said turn-off commands is reached, said second triac is turned on for blowing said fuse (5) and thereby disabling the heater.

60. The safety-assuring control device of claim 46, wherein a second triac (T2), having a control input, is connected between the junction of said first heater feed conductor (1) and said fuse (5) and ground potential and has its control input connected to a second control output of said integrated circuit unit (34) and wherein said integrated circuit unit is programmed to count the number of turnoffs of turn-off commands for the triac (T1) of said electrically controlled heater switch and to compare the counter number with a predetermined number which is at least 3 and less than 17, and when said predetermined number of said turn-off commands is reached, said second triac is turned on for blowing said fuse (5) and thereby disabling the heater.

* * * * *